(No Model.) 2 Sheets—Sheet 2.
C. M. SCHWAB.
APPARATUS FOR HOT SAWING BEAMS.
No. 410,119. Patented Aug. 27 1889.
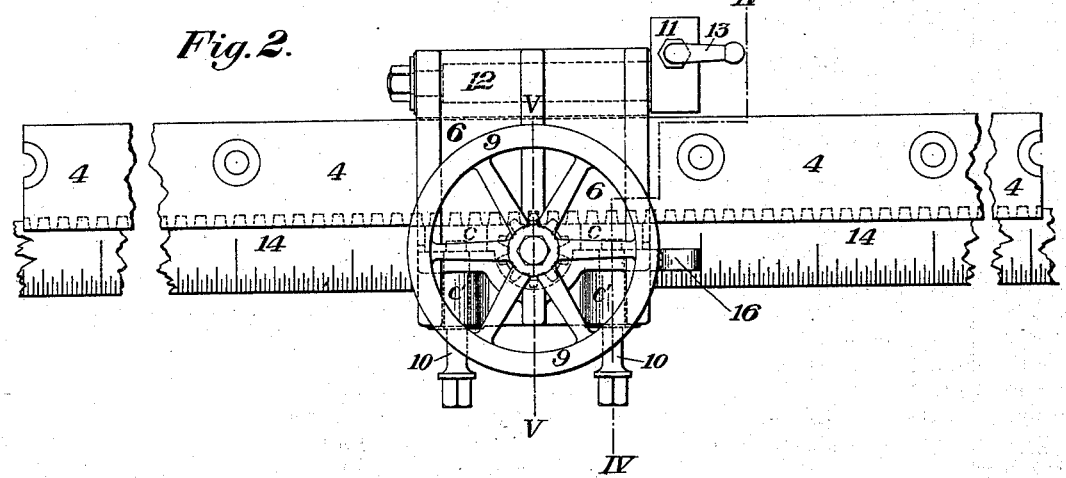
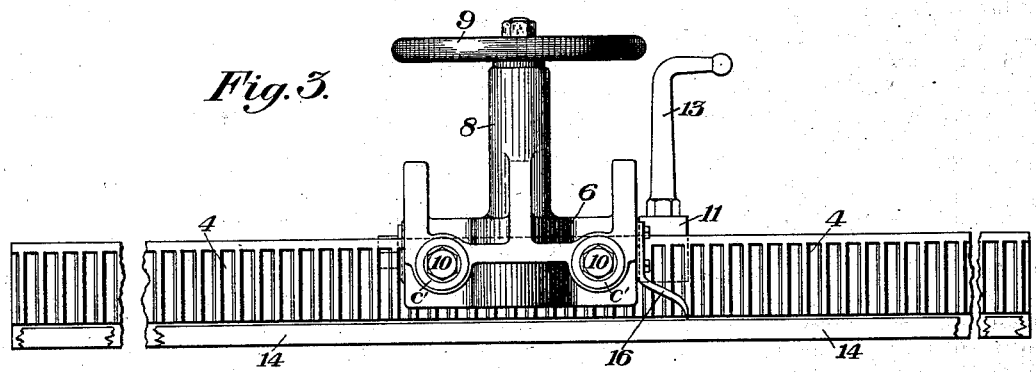
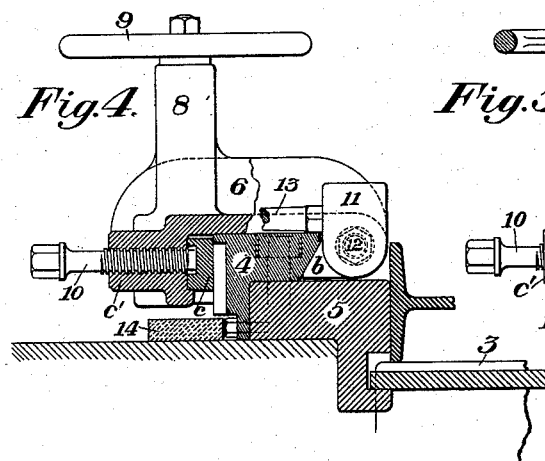
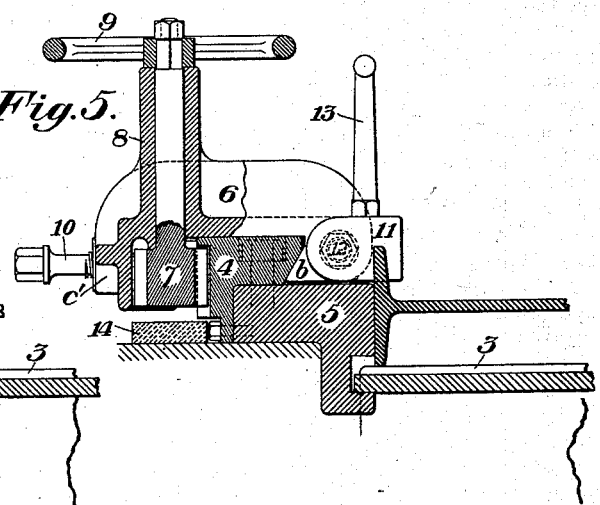
WITNESSES.
N. L. Gill.
Thomas W. Bakewell.
INVENTOR.
Charles M. Schwab
by W. Bakewell
his attorney

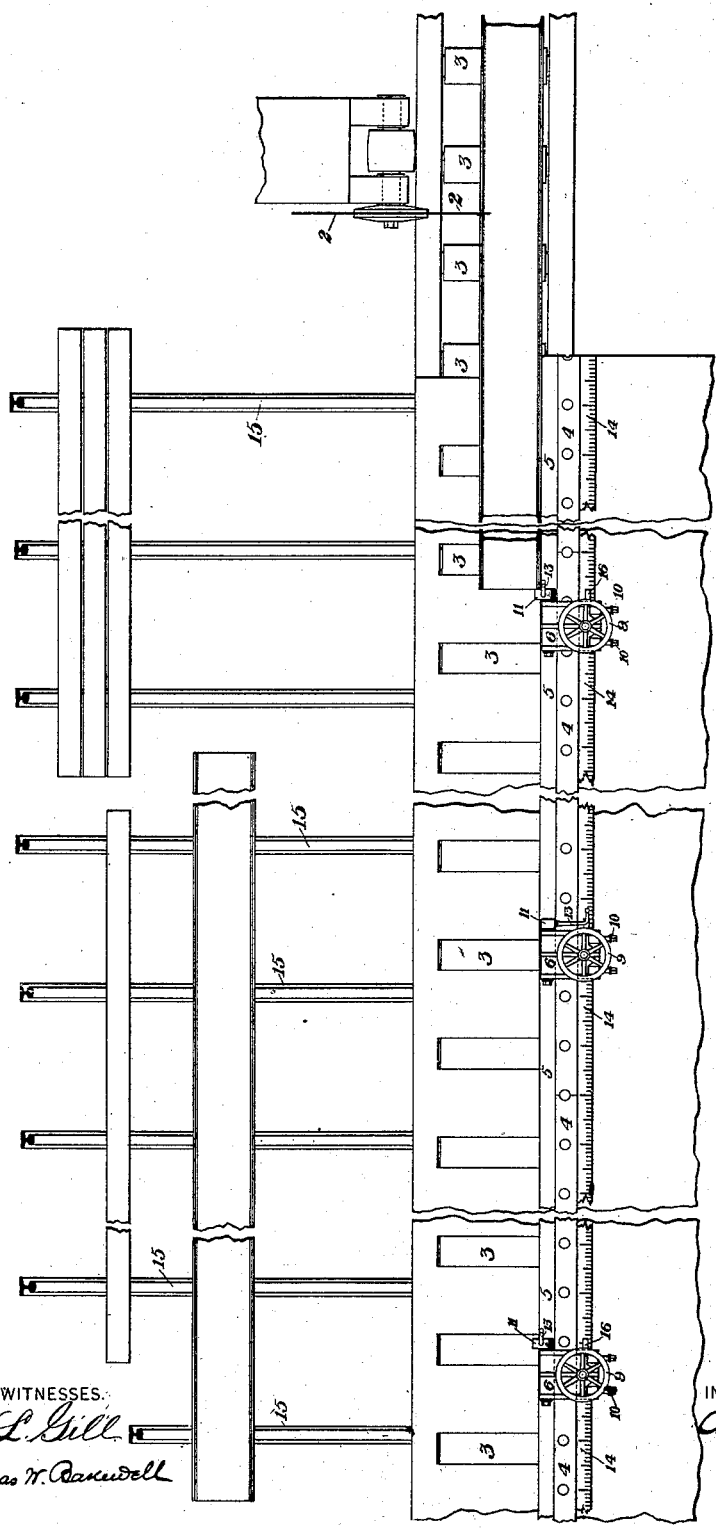

UNITED STATES PATENT OFFICE.

CHARLES M. SCHWAB, OF HOMESTEAD, PENNSYLVANIA.

APPARATUS FOR HOT-SAWING BEAMS.

SPECIFICATION forming part of Letters Patent No. 410,119, dated August 27, 1889.

Application filed March 13, 1889. Serial No. 303,144. (No model.)

*To all whom it may concern:*

Be it known that I, CHARLES M. SCHWAB, of Homestead, in the county of Allegheny and State of Pennsylvania, have invented a new and useful Improvement in Apparatus for Hot-Sawing Beams, of which the following is a full, clear, and exact description, reference being had to the accompanying drawings, forming part of this specification, in which—

Figure 1 is a plan view of my improvement. Fig. 2 is an enlarged plan view of one of the adjustable stops forming part of the apparatus. Fig. 3 is a side elevation thereof. Fig. 4 is a vertical irregular section on the line IV IV of Fig. 3. Fig. 5 is a section on the line V V of Fig. 3, showing the stop in position to engage the end of a metal beam intended to be cut.

Like symbols of reference indicate like parts in each.

The object of my invention is to provide means whereby metal beams may be sawed while hot into pieces of certain length with accuracy and rapidity.

In the drawings, 2 represents a saw of the ordinary construction for cutting pieces of hot metal, and 3 is a series of rollers arranged in a line leading, preferably, from the rolls of the rolling-mill up to and past the saw. These rollers form a feed-table, and are preferably driven so as to convey lengthwise the beam placed thereon.

In sawing the beam according to my invention, I ascertain, by a practical calculation based on the weight of the bloom from which the beam is rolled, the number and exact lengths of the pieces into which it is desirable to saw the beam, the calculation being made before the rolling of the beam is completed. I then arrange or adjust stops on the table at such position that as the beam is conveyed thereon its end shall first engage one of the stops and shall be arrested thereby in such position that there may be sawed therefrom a piece of exactly the length desired, that when the severed piece is taken out of the way and the beam advanced against the next stop it shall be in proper position to make the next cut, and that in like manner the end of the beam may be advanced against the stops in succession until the full number of cuts have been made, there being as many stops as there are different lengths of pieces to be cut. In this way I am enabled to saw the beam when hot, as it comes from the finishing-rolls, into pieces of precise lengths, with the same accuracy as in cold-sawing, whereas heretofore in hot-sawing a beam into a number of pieces only approximately-accurate results could be had, owing to the difficulty in handling and measuring the metal in its hot state.

The advantages of hot-sawing in saving time and labor are well understood, and by enabling accurate results to be had from its use my improvement is a source of great benefit and economy.

The forms of the apparatus, especially of the adjustable stops above noted, may be various, since it is within the scope of my invention to use simple pins, blocks, or stops of any sort. I have, however, devised and intend to claim specifically the peculiar form of adjustable stop shown in the drawings, though I wish it to be understood that my invention as stated in the broad claims of the patent is in no wise limited thereto.

The stop device which I show is constructed and arranged as follows:

4 is a laterally-toothed rack-bar, which extends beside the series of rollers 3, and is preferably bolted to a second supporting bar or chair 5, constructed as shown in Figs. 4 and 5.

The adjustable stop to which I have referred consists of a frame or carriage 6, set on the surface of the rack-bar, so as to be longitudinally movable thereon, and provided at one side with a downwardly-projecting tongue *b*, fitting against the side of the rack-bar, and at the other side provided with a pinion 7, which is in gear with the teeth of the rack-bar, and whose vertical shaft extends up through an inclosing-sleeve 8 of the carriage, and at the upper end is fitted with a hand-wheel 9, by which it may be rotated so as to move the carriage on the rack. In order to lock the carriage in any position, I employ bolts 10, which pass through threaded sockets *c'*, and are provided with swiveled heads *c*, bearing against the rack.

11 is a stop-block journaled at the end of the inner side of the carriage, being fixed to a pin 12, which extends through the carriage and is provided with a handle 13 for turning it axially.

The rack 4 is of about the length of the longest piece desired to be cut, and is provided with two or any greater number of the carriages 6. Three are shown in Fig. 1 of the drawings. On the outer side of and parallel with the rack-bar is a scale bar or plate 14, which is divided into degrees of lineal measure, and is made of wood, so that the heat of the beams shall not materially expand it and spoil its accuracy.

In using the apparatus I first set and lock the carriages 6 at positions on the rack corresponding to the length of the several pieces to be cut. For example, if the beam is to be cut in three pieces of fifteen, twenty, and thirty feet long, respectively, the carriages are set at the corresponding marks on the scale; or if two or more of the pieces to be cut are of the same length the adjustment of a single carriage will serve for them. I then turn the several stop-blocks 11 down into the path of the beam on the table, as shown in Fig. 5, and when the beam is delivered from the rolls upon the table its forward end will engage the first projecting stop and will be arrested thereby in exact position to be cut by the saw. When the piece is sawed through, it is pushed laterally off the rollers 3 upon a cooling bed or support 15. The stop-block 11 of the first carriage is then lifted out of the path of the beam, as shown in Fig. 4, and the beam is advanced on the rollers 3 until its end engages the stop on the next carriage. The beam is then cut again and again fed forward, and these operations are repeated until the beam has been cut into the number of pieces desired. At the end of each cut it will be found that the slight cooling of the metal will have caused it to contract somewhat, and in order to compensate for such contraction and to prevent it from affecting the accuracy of measurement I employ indexes 16, consisting of pieces of metal, which are placed opposite the stop-blocks 11 of each carriage succeeding the first. An allowance for the expansion of the beam in its heated state is also made by properly adjusting the position of the scale relatively to the saw.

The advantages of my invention will be appreciated by those skilled in the art. With the use of the apparatus and system which I have just described I am enabled to cut metal beams into pieces of different lengths with perfect accuracy, and without the loss of any time in adjusting the beam after it is placed on the table.

The necessity which imparts the advantage to the apparatus is that hot-sawing must be done when the metal is very hot, and after the beam comes from the rolls it cools so rapidly that there is not sufficient time for any measurement of the beam or adjustment of the apparatus to suit different lengths, and it is seldom that a beam can be cut economically into pieces of equal length. Added to this, the great heat of the beam makes it practically impossible to make any accurate measurements or to place any marks upon it to indicate where the cuts should be made.

I claim—

1. The combination, with the rotary cutter, of a table for supporting the beam while being cut, and adjustable stops by which the lengths to be cut may be fixed on the table preparatory to placing the beam thereon, substantially as and for the purposes described.

2. The combination, with the rotary cutter, of a table for supporting the beam while being cut, adjustable stops by which the lengths to be cut may be fixed on the table preparatory to placing the beam thereon, and driven feed-rollers by which the beam is moved, substantially as and for the purposes described.

3. The combination of a beam-supporting table, a rack, a stop-carriage mounted on the rack, and a pinion on the carriage engaging the rack, substantially as and for the purposes described.

4. The combination of a beam-supporting table, longitudinally-movable carriages, and stops situate on the carriages and movable into or out of the path of the beam on the table, substantially as and for the purposes described.

5. The combination of the rack, the carriage mounted thereon, the pinion, and the pivoted stop, substantially as and for the purposes described.

6. The combination of a beam-supporting table, a longitudinally-movable carriage, a stop situate on the carriage and movable into or out of the path of the beam on the table, and locks for the carriage, substantially as and for the purposes described.

7. The combination, with a table for supporting hot beams, of a wooden scale extending beside the same, substantially as and for the purposes described.

8. The combination, with the rotary cutter, of a table for supporting the beam while being cut, adjustable stops, and an index connected with and set in advance of the stop for the purpose of compensating for the contraction of the beam, substantially as and for the purposes described.

9. In a plant for continuously working a bloom or billet into two or more rails or bars of predetermined lengths the equivalent of or corresponding to the size of the bloom or billet, the combination, with the rolls, of a receiving-table for receiving the hot rail or bar from the rolls, an interposed rotary cutter for cutting the hot rail or bar into lengths as it comes from the roll, and stops which are longitudinally adjustable on the table to and from the rotary cutter and rolls, substantially as and for the purposes described.

10. In a plant for continuously working a bloom or billet into two or more rails or bars of predetermined length equivalent of or corresponding to the size of the bloom or billet, the combination, with the rolls, of a receiving-table for receiving the hot rail or bar from the rolls, an interposed rotary cutter for cutting the hot rail or bar into lengths as it comes from the roll, and stops which are longitudinally adjustable on the table to and from the rotary cutter and rolls, the leading one of said stops, or that nearest the saw, adapted to be moved into and out of the path of the advancing beam, substantially as and for the purposes described.

In testimony whereof I have hereunto set my hand this 6th day of March, A. D. 1889.

CHARLES M. SCHWAB.

Witnesses:
W. H. CORBETT,
J. A. POTTER.